United States Patent [19]

Reitz et al.

[11] 4,325,890

[45] Apr. 20, 1982

[54] PHENOL-FORMALDEHYDE CONDENSATES, THEIR PREPARATION AND THEIR USE AS DISPERSING AGENTS, LIQUEFACTION AGENTS AND TANNING AGENTS

[75] Inventors: Gunther Reitz; Vaclav Kaspar, both of Cologne; Karlhans Jakobs, Bergisch-Gladbach; Kurt Schaupp, Cologne, all of Fed. Rep. of Germany

[73] Assignee: Bayer Aktiengesellschaft, Leverkusen, Fed. Rep. of Germany

[21] Appl. No.: 176,384

[22] Filed: Aug. 8, 1980

[30] Foreign Application Priority Data

Aug. 30, 1979 [DE] Fed. Rep. of Germany ....... 2934980

[51] Int. Cl.$^3$ .............................................. C07C 143/42
[52] U.S. Cl. .................................... 260/512 C; 8/589
[58] Field of Search .................................... 260/512 C

[56] References Cited

U.S. PATENT DOCUMENTS 2,171,806  9/1939  Russell et al. .................. 260/512 C

FOREIGN PATENT DOCUMENTS 595211  11/1947  United Kingdom ............ 260/512 C
1209286  10/1970  United Kingdom ............ 260/512 C

*Primary Examiner*—Nicky Chan
*Attorney, Agent, or Firm*—Sprung, Felfe, Horn, Lynch & Kramer

[57] ABSTRACT

Polycondensates of phenols and formaldehyde which contain sulphonic acid groups and salts thereof bonded to the phenol either directly or via a methylene bridge are prepared by reacting a neutralized reaction product of phenols and sulphonating agents, which contains a mixture of the starting phenol, phenolsulphonic acid and bis-(hydroxyphenyl) sulphones, with formaldehyde and a bisulphite at a pH value of 4–8.

2 Claims, No Drawings

PHENOL-FORMALDEHYDE CONDENSATES, THEIR PREPARATION AND THEIR USE AS DISPERSING AGENTS, LIQUEFACTION AGENTS AND TANNING AGENTS

The invention relates to polycondensates of phenols and formaldehyde which contain sulphonic acid groups and salts thereof bonded to the phenol either directly or via a methylene group. The polycondensates are characterised in that they are prepared by reacting a neutralised reaction product of phenols and sulphonating agents, which contains a mixture of the starting phenol, phenolsulphonic acids and bis-(hydroxyphenyl) sulphones, with formaldehyde and a bisulphite at a pH value of 4–8, preferably 4.5–7.5.

By phenols there are understood, in particular, mononuclear and dinuclear compounds. Non-fused phenols are preferred. The dinuclear non-fused phenols can be bonded to one another directly or via an alkylene group.

Phenol, alkylphenols, in particular those with 1–9 carbon atoms in the alkyl chain, such as cresols and nonylphenol, bisphenols, such as bis-(hydroxyphenyl)-propane, and hydroxybiphenyl are preferred. Phenol and m-cresol are particularly preferred. The phenolic compounds can be linked with formaldehyde, for example with aqueous 20–40% strength formaldehyde solution, or with paraformaldehyde to give known polycondensates.

Bisulphites which are used are alkali metal salts, alkaline earth metal salts or ammonium salts, in particular $NaHSO_3$, $Na_2S_2O_5$, $KHSO_3$ and $Ca(HSO_3)_2$.

In the polycondensates according to the invention, the groups $$-SO_3M \qquad (I)$$

and $$-CH_2-SO_3M \qquad (II)$$

in which $M = H$, Na, K, Li, $\frac{1}{2}Ca$, $\frac{1}{2}Mg$ or $N^+R_4$, wherein $R = C_{1-6}$-alkyl which is optionally substituted by hydroxyl, it being possible for the radicals R to be identical to or different from one another, are bonded to the benzene rings.

The ratio of the groups (I) to the groups (II) can have any desired value, and is preferably ($\frac{1}{3}$ to 3) mols of (I) to 1 mol of (II). The molar ratio of the phenolic compounds in the abovementioned sense to the sum of the groups (I) and (II) is 1:1.1 to 1:0.5, preferably 1:1.0 to 1:0.6.

The invention furthermore relates to a process for the preparation of the polycondensates according to the invention by reacting the neutralised reaction products of phenols and sulphonating agents with formaldehyde and bisulphite at a pH value of 4–8.

The reaction is carried out by a one-kettle process in which the phenol is reacted with a sulphonating agent and the sulphonation product is neutralised to a pH value of 7–8 and then reacted with formaldehyde and bisulphite at a pH value of 4–8.

A preferred molar ratio of phenol to sulphonating agent to bisulphite to formaldehyde is 1:(0.3–0.9):(0.3–0.9):(1–3).

The sulphonating agents used are, for example, chlorosulphonic acid, oleum and, preferably, sulphuric acid.

In a preferred process, the reaction is carried out, after the neutralisation, with 0.6 to 2 mols of formaldehyde per mol of the phenolic component, at a pH value of 7–8, and then with 0.3 to 0.9 mol of bisulphite and 0 to 1.5 mols of formaldehyde at pH 4–8.

In detail, the preferred process is carried out as follows:

The phenolic compound is reacted with the sulphonating agent at temperatures of 30°–180° C., the sulphonic acid $$P-SO_3M \qquad (III)$$

wherein

M has the abovementioned meaning and

P is an abbreviation for the phenolic compound, and the bis-(hydroxyphenyl) sulphone $$P-SO_2-P \qquad (IV)$$

wherein P has the abovementioned meaning, being formed.

The molar ratio of phenolic compound to sulphonating agent is within the abovementioned molar ratio and is particularly preferably 1:(0.4–0.7). Water of condensation which has formed is distilled off during the sulphonation. As the reaction progresses, the acid content of the reaction mixture decreases, and the progress can thus be determined titrimetrically. In a reaction of phenol and $H_2SO_4$, the sulphonation is most favourably ended when between 25 and 45%, preferably between 30 and 40%, of the acid equivalents initially employed can still be determined in the reaction mixture by titration. The process which leads to the formation of a mixture of compounds (III) and (IV) and starting phenol in the molar ratio (0.25–0.45) (0.05–0.25) (0.1–0.7) is preferred.

The second step of the preparation process is the neutralisation of the reaction mixture formed to a pH value of 7–8, preferably of 7–7.5. Any desired bases and alkalis can be used as the neutralising agents, sodium hydroxide solution, potassium hydroxide solution and milk of lime being preferred.

The resulting mixture of neutralised sulphonic acid, sulphone and unreacted phenolic compound is subsequently reacted with formaldehyde and a bisulphite to give the condensates according to the invention. The process in which the reaction step following the neutralisation, that is to say the third step, consists of a reaction with aqueous 20–40% strength formaldehyde solution is preferred. This reaction is carried out at 60° C. to the boiling point, preferably at 80° C. to the boiling point, over a period of 10 minutes to 3 hours, preferably 30 minutes to 2 hours, using 0.6 to 2 mols, preferably 0.8 to 1.1 mols, of formaldehyde solution per mol of phenolic compound. In this reaction, in particular, methylol compounds of the sulphonic acids (III), of the sulphones (IV) and of the phenolic starting compound(s) still present are formed.

The fourth process step is the reaction with a bisulphite salt, for example with aqueous $NaHSO_3$ solution, at 80° C. to 120° C., preferably at 100°–110° C., over a period of 30 minutes to 5 hours, preferably 1 to 3 hours, at a pH value of 4–8, preferably 4.5–7.5. The molar ratio of phenolic starting compound(s) to bisulphite is 1:(0.9 to 0.3), preferably 1:(0.7 to 0.4). In this reaction, the methylol groups bonded to the phenols containing sulphonic acid groups and sulphone groups and to the phenolic starting compound(s) react with the bisulphite to give the groups (II), so that the groups (I) and (II) are now bonded, according to the invention, to the phenolic starting compounds.

The ratio between the formaldehyde so far added and the bisulphite is preferably 1:(1–1.4).

The last process step is the condensation of the compounds obtained as described above to high-molecular compounds, a further (0.8–1.5) mols of formaldehyde preferably being added per mol of phenolic compound. This condensation reaction proceeds at 100° to 180° C., preferably 100° to 160° C., and lasts 2 to 10, preferably 4–6, hours. Compounds which are capable of reacting with at least two equivalents of formaldehyde, for example nitrogen-containing compounds, such as urea, amines or amides, or also enolisable compounds, such as acetone, cyclohexanone or other ketones, can also be added during the post-condensation reaction.

20 to 50% strength aqueous solutions which can be dried to give a brittle product, which can readily be dissolved again, are obtained.

The particular advantage of the process is that it proceeds at a pH value below 8, preferably below 7.5. This ensures that the entire reaction can be carried out industrially in a single kettle, for example an enamel kettle. Such a procedure is not possible for a condensation reaction of this type according to the state of the art, in particular because the condensation of phenolic compounds with sulphite and formaldehyde has hitherto always been carried out at an alkaline pH value, since experience has shown that condensation at a non-alkaline pH value led to the formation of insoluble phenolic resins. It should also be emphasised that the reaction sequence described in the process and the molar ratios play an important part in the success of the reaction.

The invention also relates to the use of the condensates according to the invention and agents containing them.

The compounds according to the invention are excellent dispersing agents for organic and inorganic substances in an aqueous medium, preferably for organic dyestuffs and pigments, for example for the preparation of finished forms or for the use of the dyestuffs and pigments in the dye bath. They are furthermore used as liquefaction agents for mixtures of organic or inorganic compounds with water, for example for metal oxides or for cement.

The compounds are also used as tanning substances for leather.

Their use as dispersing agents and liquefaction agents is preferred.

EXAMPLE 1

188 g of phenol and 100 g of $H_2SO_4$ are brought together and a mixture of water and a little phenol is then distilled off at 120°–140° C. and in vacuo until 1 g of the reaction mixture still contains 2.85 m equivalents of acid. 200 g of $H_2O$ and the phenol which has been distilled off are added, and 45% strength sodium hydroxide solution is added until a pH value of 7.2 is reached. 150 g of 30% strength formaldehyde solution are then added, the mixture is heated to the reflux temperature for one hour, 260 g of 40% strength $NaHSO_3$ are added and the mixture is boiled under reflux for a further two hours. A further 150 g of 30% strength formaldehyde solution are then added and the mixture is heated to 120° C. under increased pressure for four hours. A dark brown clear solution is formed.

EXAMPLE 2

188 g of phenol and 100 g of $H_2SO_4$ are brought together and a mixture of water and a little phenol are then distilled off at 120°–140° C. in vacuo, until 1 g of the reaction mixture still contains 2.95 m equivalents of acid. The distillate and 200 g of $H_2O$ are added to the reaction mixture, and 45% strength sodium hydroxide solution is also added until a pH value of 7.2 is reached. After adding 150 g of 30% strength formaldehyde solution, the mixture is heated to the reflux temperature for one hour, 195 g of 40% strength $NaHSO_3$ solution are added, the mixture is heated to the boiling point for a further two hours, a further 125 g of 30% strength formaldehyde solution are added and the mixture is boiled under reflux for six hours. A dark brown clear solution is formed.

EXAMPLE 3

188 g of phenol and 100 g of $H_2SO_4$ are brought together and a mixture of water and a little phenol is then distilled off at 120°–140° C. and in vacuo, until 1 g of the reaction mixture still contains 2.98 m equivalents of acid. The distillate and 200 g of $H_2O$ are added to the reaction mixture, and 45% strength sodium hydroxide solution is also added until a pH value of 7.2 is reached. After adding 150 g of 30% strength formaldehyde solution, the mixture is heated to the reflux temperature for one hour, 169 g of 40% strength $NaHSO_3$ solution are then added, the mixture is heated to the boiling point for a further two hours, a further 115 g of 30% strength formaldehyde solution are added and the mixture is boiled under reflux for six hours. A dark brown clear solution is formed.

EXAMPLE 4

118 g of phenol and 130 g of $H_2SO_4$ are brought together and a mixture of water and a little phenol is then distilled off at 120°–140° C. and in vacuo, until 1 g of the reaction mixture still contains 3.42 m equivalents of acid. The distillate and 200 g of water are added to the reaction mixture, and 45% strength sodium hydroxide solution is also added until a pH value of 7.2 is reached. After adding 150 g of 30% strength formaldehyde solution, the mixture is heated to the reflux temperature for one hour, 169 g of 40% strength $NaHSO_3$ solution are added, the mixture is heated to the boiling point for a further two hours, a further 115 g of 30% strength formaldehyde solution are added and the mixture is boiled under reflux for five hours. A dark brown clear solution is formed.

The pH value of the solutions obtained according to Example 1–4 is between 6 and 6.5.

EXAMPLES 5–8

Dyeing from polyester fibres

Polyester fibre yarns are introduced, in a liquor ratio of 1:40, into a bath which is warmed to 60° C. and contains, per liter, 0.25 g of a dyestuff of the formula

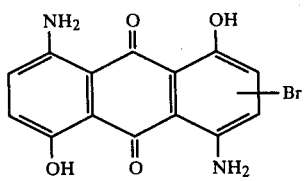

and in each case 2 g of one of the condensation products prepared according to Example 1-4. The pH value of the bath is adjusted to 4.5-5 with acetic acid. The bath is then heated to 125° C. and is kept at this temperature for 60 minutes. A uniform blue dyeing which is free from specks is obtained.

EXAMPLES 9-10

38 g of the condensate prepared according to Example 1 are added to 54 g of the following dyestuff: 2:1 chromium complex of the azo dyestuff 2-amino-1-hydroxybenzene-4-ethylsulphone→1-methylsulphonylamine-7-naphthol, and the mixture is ground, as an approximately 70% strength aqueous dispersion, in a bead mill. The mixture is then dried in a spray-dryer at an inlet temperature of 180° C. and an outlet temperature of 80° C. A dyestuff which is very readily soluble at low temperatures and at high temperatures and which is particularly suitable for dyeing textiles of natural and synthetic polyamides in a grey shade is obtained.

Equally good results are also achieved if a product according to Example 4 is used instead of the product from Example 1.

EXAMPLE 11

50 g of the dyestuff C.I. Disperse Yellow 99 (C.I. 48 420) are made into a slurry with 154 g of the compound prepared according to Example 2 and the slurry is ground twice, as an approximately 35% strength dispersion, in a bead mill. The mixture is then dried in a spray-dryer at an inlet temperature of 180° C. and an outlet temperature of 80° C. A dyestuff formulation which can readily be dispersed and is particularly suitable for printing and dyeing polyester textiles in a yellow colour shade is obtained.

EXAMPLE 12

60 g of the dyestuff C.I. Disperse Blue 73 (C.I. 63 265) are made into a slurry with 141 g of the compound prepared according to Example 4, the slurry is ground twice, as an approximately 35% strength dispersion, in a bead mill and the mixture is then dried in a spray-dryer at an inlet temperature of 180° C. and an outlet temperature of 80° C. A dyestuff formulation which is particularly suitable for printing and dyeing polyester textiles in a blue colour shade is obtained.

What is claimed is:

1. Polycondensates of phenols and formaldehyde which contain sulphonic acid groups and salts thereof bonded to the phenol either directly or via a methylene bridge, characterized in that they are prepared in a one-kettle reaction, by reaction of 1 mol of the phenol with 0.3-0.9 mol of sulphonating agent in a strongly acid medium, neutralization of the product to a pH value of 7-8, further reaction with 0.6-2 mols of formaldehyde, reaction with 0.3-0.9 mol of bisulphite and then with 0.8-1.5 mols of formaldehyde at a pH value of 4-8.

2. Polycondensates according to claim 1, characterised in that they are prepared from mononuclear, non-fused phenols.

* * * * *